Oct. 12, 1948.  H. CRUZAN  2,451,278
CABIN PRESSURE REGULATOR VALVE
Filed July 12, 1944
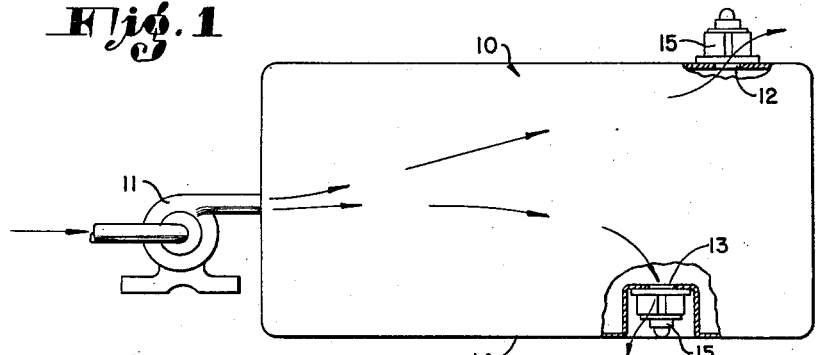
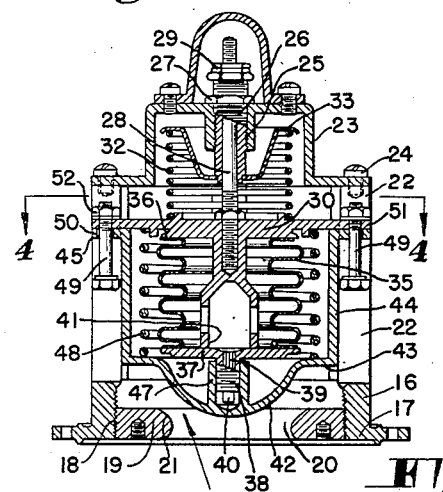
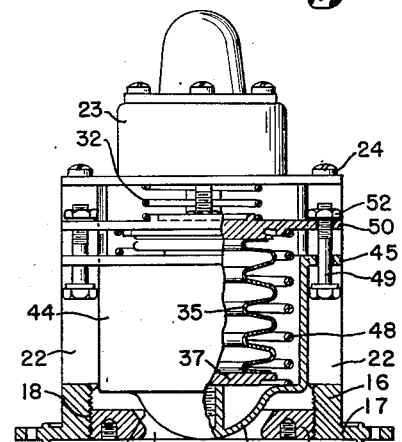
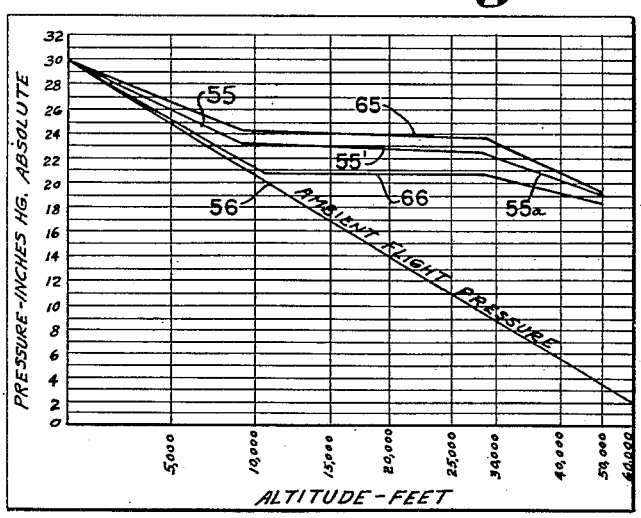
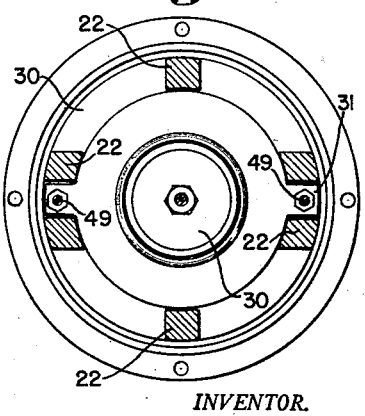
INVENTOR.
HAROLD CRUZAN
BY
ATTORNEY Patented Oct. 12, 1948

2,451,278

UNITED STATES PATENT OFFICE 2,451,278

CABIN PRESSURE REGULATOR VALVE

Harold Cruzan, Los Angeles, Calif.

Application July 12, 1944, Serial No. 544,599

13 Claims. (Cl. 98—1.5)

My invention relates to means for maintaining and controlling air pressure in the cabins of aircraft during flight, and relates in particular to the simple outlet valve device for regulating the internal cabin pressure within spaced limits and in accordance with a predetermined value.

Control of air pressure within the cabins of aircraft is now accomplished by use of relatively complicated pressure sensitive devices which control outlet valves so that during the flight of aircraft pressure above the ambient flight pressure will be maintained within the cabins. It is an object of my invention to provide a simple valve device which may in many instances replace the complicated and expensive mechanisms referred to in the foregoing.

It is an object of the invention to provide an outlet valve adapted to be mounted on the exterior of a pressurized portion of a cabin or in a bell or depression which projects into the cabin space, which will control the outflow of air from the cabin so as to maintain within the cabin pressure conditions which are within the specifications established by the United States Army. For example, this simple and inexpensive valve device may have its cooperating parts so related that between sea level and an altitude of about 8000 feet, the cabin pressure will correspond to ambient flight pressure, within relatively close limits of deviation, and which will maintain the cabin pressure isobaric until the aircraft reaches an ambient flight pressure corresponding to an altitude of about 25,000 feet, and which will thereafter maintain a differential pressure between the cabin interior and the ambient flight pressure existing outside the aircraft cabin.

It is an object of the invention to provide an outlet valve for a pressurized cabin which controls the flow of air from the cabin so as to maintain prescribed pressure conditions in the cabin and which incorporates means for release of excess pressure from the cabin so that such excess pressure will not exceed a prescribed value and therefore will not endanger the cabin structure.

It is a further object of the invention to provide an outlet valve device for a pressurized cabin, having an air outlet port for connecting the interior of the cabin with the exterior, and a valve disposed in external relation to the port and having pressure sensitive means of simple character to automatically move the valve inward toward the port as the aircraft ascends from a relatively low level—for example, near sea level—through various higher altitudes within range of flight of the aircraft, the valve device being characterized by an ability to maintain prescribed pressure conditions within the pressurized cabin without the need for any internal or complicated pressure sensitive mechanism.

A further object of the invention is to provide a valve of this character which is adjustable for different conditions of operation, including different rates of flow of air through the cabin interior or through the outlet port of the valve.

It is an object of the invention to provide a simple outlet valve for pressurized cabins, having an air outlet port and a valve movably disposed in external relation to the port, that is to say—the valve cooperates with the part of the port which faces toward the external atmosphere instead of that portion of the port which faces the cabin interior—this control valve device having in a position outside the cabin a control element which is of aneroid character and functions in response to changes in pressure conditions to which it is subjected to move the valve toward and away from the air outlet port of the device.

A further object of the invention is to provide in this outlet valve device a cooperation of parts which will permit outward movement of the valve with relation to the air outlet port when the pressure differential between the interior and exterior of the cabin rises above a predetermined value.

Further objects and advantages of the invention will be brought out in the following part of the specification.

Referring to the drawing which is for illustrative purposes only,

Fig. 1 is a schematic view showing manners in which the invention may be connected to a pressurized aircraft cabin.

Fig. 2 is an enlarged sectional view of a preferred embodiment of my outlet valve device.

Fig. 3 is a partly sectioned view, showing the parts of the device in the positions which they assume during flight of the aircraft.

Fig. 4 is a cross-sectional view taken as indicated by the line 4—4 of Fig. 2.

Fig. 5 is a graph showing cabin pressures obtainable by use of the outlet valve device.

In Fig. 1 of the drawings I show a cabin 10 of an aircraft into which air under pressure is continuously fed by some suitable means such as a blower 11. For the escape of air from the cabin 10 so that a continuous circulation of air or a continuous replacement of air may be obtained, openings 12 and 13 are provided within the cabin wall 14. Outlet valve devices 15 are mounted on the wall 14 of the cabin so as to communicate through the openings 12 and 13 with the interior space of the cabin. It will be understood that one or more of these valve devices 15 may be employed and that they may be disposed so as to produce a desired circulation of air through the cabin, whereby stagnant zones will be avoided.

In Figs. 2 and 4 I show details of construction of a preferred form of my simple valve device. It includes a frame or support 16 having an annular wall 17 which may be connected to the wall 14 of the cabin 10, this wall 17 having a threaded opening 18 to receive an annular wall member 19 which has therein an air outlet opening or port 20, and which is externally threaded so that by rotation it may be caused to move outward or inward in the threaded opening 18 of the support 16. That portion of the annular wall 19 which defines the port 20 is rounded or flared as indicated at 21. The support 16 has a plurality of arms 22, for example—six—projecting outward therefrom in spaced arrangement around the projected axis of the port 20, and a supporting wall 23 is connected to the outer ends of these arms 22 by means of screws 24.

The member 23 has a threaded opening 25 axially aligned with the port 20, this threaded opening 25 receiving a threaded bushing 26 which may be adjusted inward or outward as may be required in adjustment of the valve device and then locked by means of a lock nut 27. A bar or stem 28 is slidable in the opening of the bushing 26 and has adjustable means 29 such as lock nuts thereon for limiting the inward movement of the stem 28.

The stem 28 has on its inner end a base 30 comprising a circular plate having in its peripheral portion projections 31 slidable between the bars 22. This base 30 is adjustable toward and away from the port 20. A compression spring 32 is disposed so that one of its ends will engage the upper or back face of the base 30, and so that its other end will engage an adjustable spring compressor plate 33 which is secured to the lower end of the bushing 26. This spring 32, the pressure of which may be varied by adjusting the bushing 26 through the threaded opening 25, urges the base 30 toward the port 20 and into a position which is determined by the setting of the stop 29 on the stem 28. It will be perceived accordingly that the position of the base 30 may be varied merely by adjusting the stop 29 and that the base 30 will yield upwardly or outwardly under a pressure which is determined by the adjustment of the spring 32.

On the lower or inner face of the base 30 there is a collapsible chamber member consisting of a metal bellows 35, one end of which is connected to an annular flange 36 formed on the base 30 and the other end of which is connected to a circular plate or wall 37 which has a threaded axial projection 38 equipped with an opening 39 to which an evacuating tube 40 is connected. When this collapsible member, represented by the bellows 35, and its associated part is evacuated, external air pressure forces the plate 37 against a stop 41 consisting of a projection from the base 30.

A valve 42 is provided for external cooperation with the port 20, this valve consisting of a convexly rounded wall, having at the periphery thereof the radial annular wall 43 which joins a cylindric wall 44 so that a cup is formed from the walls 42, 43, and 44 which substantially surrounds the bellows 35. Flanges 45 project from the upper margin of the cylindric wall 44 and extend into the spaces between the bars 22. The valve 42 has on its outer face an internally threaded projection 47, whereby it may be connected to the wall 37 of the evacuated capsule comprising the bellows 35, so that the valve 52 and the wall 37 act as a single part. A compression spring 48 is disposed inside the cylindric wall 44 and between the base 30 and the annular wall 43 associated with the valve 42, to exert a force urging the valve 42 toward the port 20. The valve device also includes means for limiting the movement of the valve 42 relatively to the base 30 so that by this adjustment, the movement of the valve 42 toward the port 20 may be governed. This means of adjustment consists of screw members 49 which are extended through openings 50 in the flanges 45 and aligned openings 51 in the base 30. When the screws 49 are screwed in place in the plate 30, they become an integral part of the member 30 with the projected end portion carrying the lock nut 52. The effective lengths of these screws 49 may be varied by screwing them inward or outward.

It is to be understood, of course, that the valve 42 is always open, at least to some extent, so that the cabin will be ventilated at all times, air under pressure being introduced into the cabin from the supercharger or blower 11, and leaving the cabin by way of the valve port 20. The amount of air circulating through the cabin and the cabin pressure, is determined by the amount of air allowed to pass through the port 20 and this in turn is determined by the position of the valve 42.

Because the valve 42 is open at all times it has been found that superior results are obtained by convexly contouring the seating surface of said valve and although said seating surface is convex, the effective area of the outlet valve port is substantially equal to the effective cross sectional area of the aneroid or bellows 35. This is necessary in order to obtain the desired control of cabin pressure in the isobaric range, which cabin pressure is maintained at substantially a constant level as shown at 55' in the chart of Fig. 5.

In Fig. 2 the outlet valve device is shown with its cooperating parts in the positions which they assume when the device is at sea level. The base 30 has been adjusted to a position wherein the valve 42 will be spaced from the port 20 a distance determined in accordance with the conditions of operation prescribed for the device, such conditions including rate of flow of air through the port 20 and pressures which are to be maintained at different times within the cabin. The spring 32 is set by adjustment of the bushings 26 so that the base 30 and the valve 42 will yield upward or outward in response to a predetermined pressure differential applied to the face of the valve 42 and transmitted to the base 30.

At sea level atmospheric pressure against the valve 42 collapses the bellows 35 and compresses the spring 48. As the aircraft to which the valve device is attached ascends, there is a reduction in the pressure applied to the bellows 35 so that it will expand, thereby carrying the valve 42 toward the port 20 to restrict the flow of air outward through the port 20. It will be perceived that the valve 42 is exposed to pressure of air which is flowing outward through the port 20 and that when the valve 42 is moved into a position such as that at which it is shown in Fig. 3, by expansion of the bellows 35, the valve 42 will be exposed to the pressure of air within the cabin, through the port 20. The spring 48 is so calibrated that the valve 42 will not start to close until a desired altitude has been reached. For example, as shown by the curve of cabin pressure 55 of the graph, Fig. 5, cabin pressure will follow ambient flight pressure 56 until an altitude of about 8000 feet is reached. Then, the closing of the valve 42 by the aneroid means associated therewith will cause the curve to level off as indicated at 55', as the result of a restriction of outflow of air through the valve 20 in such a manner as to maintain the pressure of air within the cabin substantially constant until an altitude of approximately 30,000 feet is reached by the aircraft. At this time the cabin pressure differential exerted against the valve 42 exposed in the port 20 will be such as to overcome the force of the spring 32 so that the base 30 and the part supported thereby will move upward or outward as further expansion of the bellows 35 occurs, thereby maintaining the valve opening 60, Fig. 3, at such area with relation to the rate of flow of air into the cabin and the pressure differential existing between the interior and the exterior of the cabin that the cabin pressure will drop off as indicated by the portion 55a of the curve 55, to thereafter maintain substantially constant pressure differential between the interior and exterior of the cabin.

From the foregoing explanation, and from the graph, Fig. 5, it will be noted that this simple control valve maintains within the cabin a pressure which follows ambient flight pressure until a prescribed altitude is reached, and then maintains pressure within the cabin while ambient flight pressure drops with increase in altitude, and then when a predetermined differential pressure between the cabin and ambient flight pressure is reached, controls the outflow of air from the cabin, through the valve port 20, in a manner to produce a drop in the cabin pressure which corresponds to the drop in ambient flight pressure, thereby preventing the air pressure within the cabin from exceeding a prescribed differential from ambient flight pressure.

In the setting of the valve device, the rate of flow of air is taken into consideration and as part of the adjustment, the port-forming ring 19 is adjusted inward or outward with relation to the valve 42. The characteristics of the valve do not change greatly when the device is adjusted for different rates of flow. The curve 55 in Fig. 5 is a graph of cabin pressure maintained by the valve with a flow of five pounds per minute of air through the valve port. Where the rate of airflow is increased, the cabin pressure will follow the values indicated by the curve 65 and where the flow is decreased, cabin pressure will follow the curve 66.

Adjustment of the screws 49 inward or outward will determine the expansion of the bellows 35 when the device is operating on differential.

I claim as my invention:

1. In a system for controlling and maintaining pressure within a cabin having means for delivering a flow of air under pressure into said cabin, an outlet valve means for controlling the flow of air from the cabin, comprising: a support adapted to be connected to the cabin wall; a wall carried by said support defining an outlet port connecting the interior of said cabin with the exterior thereof; a valve disposed outside said port so as to be moved toward and away from the port, said valve having an inner face exposed through said port to pressure of air derived from the interior of said cabin; a base supported by said support in a position spaced outward from said valve and so as to have movement toward and away from said port; an adjustable stop for limiting the movement of said base toward said port; adjustable spring means for urging said base toward said stop; and a control element comprising an evacuated collapsible chamber member exposed to atmospheric pressure and connected at one end to said base and at the other end to said valve so that expansion of said collapsible member will move said valve toward said port, said control element also incorporating spring means acting between said base and said valve to urge said valve toward said port.

2. In a system for controlling and maintaining pressure within a cabin having means for delivering a flow of air under pressure into said cabin, an outlet valve means for controlling the flow of air from the cabin, comprising: a support adapted to be connected to the cabin wall; a wall carried by said support defining an outlet port connecting the interior of said cabin with the exterior thereof; a valve disposed outside said port so as to be moved toward and away from the port, said valve having an inner face exposed through said port to pressure of air derived from the interior of said cabin; a base supported by said support in a position spaced outward from said valve and so as to have movement toward and away from said port; means for limiting movement of said valve relatively to said base; an adjustable stop for limiting the movement of said base toward said port; adjustable spring means for urging said base toward said stop; and a control element comprising an evacuated collapsible chamber member exposed to atmospheric pressure and connected at one end to said base and at the other end to said valve so that expansion of said collapsible member will move said valve toward said port, said control element also comprising spring means to urge said valve toward said port.

3. In a system for controlling and maintaining pressure within a cabin having means for delivering a flow of air under pressure into said cabin, an outlet valve means for controlling the flow of air from the cabin, comprising: a support adapted to be connected to the cabin wall; a wall carried by said support defining an outlet port connecting the interior of said cabin with the exterior thereof; a valve disposed outside said port so as to be moved toward and away from the port, said valve having an inner face exposed through said port to pressure of air derived from the interior of said cabin; a base supported by said support in a position spaced outward from said valve and so as to have movement toward and away from said port; means for limiting movement of said valve relatively to said base; an adjustable stop for limiting the movement of said base toward said port; adjustable spring means for urging said base toward said stop; a control element comprising an evacuated collapsible chamber member exposed to atmospheric pressure and connected at one end to said base and at the other end to said valve so that expansion of said collapsible member will move said valve toward said port, said control element also comprising spring means to urge said valve toward said port; and means for adjusting said port-defining wall in said support toward and away from said valve.

4. In a system for controlling and maintaining pressure within a cabin having means for delivering a flow of air under pressure into said cabin, and outlet valve means for controlling the flow of air from the cabin, comprising: means forming an outlet valve port connecting the cabin interior with the exterior; a valve in movable relation to said port, the inner face of said valve being exposed to pressure of air derived from the interior of said cabin through said port; and pressure responsive means outside said cabin connected to the outer portion of said valve comprising an aneroid element subjected to atmospheric pressure and having a base and a movable part, said movable part being connected to said valve so as to move said valve inward toward said port as said aneroid element expands, and yieldable means for supporting said base in spaced relation to said valve port so that said valve may move automatically in a direction to permit an increased flow of air through said port when the pressure existing in said port, acting on the adjacent face of said valve, exceeds the force of said yieldable means transmitted to the other side of said valve through the aneroid.

5. In a system for controlling and maintaining pressure within a cabin having means for delivering a flow of air under pressure to said cabin: outlet valve means for controlling the flow of air from the cabin, said means comprising means forming an outlet valve port connecting the cabin interior with the exterior; a valve member in movable relation to said port externally thereof; pressure responsive means connected to said valve and disposed externally of said cabin and responding to variations in pressure of the air outside of said cabin for varying the position of said valve relative to said port as the pressure of air outside said cabin varies; guide means for the pressure responsive means and valve whereby said means and valve may move toward and away from the port; and yieldable means urging said pressure responsive means and valve toward said port and yielding to enable automatic outward movement of said valve when the differential of pressure between the interior and exterior of said cabin reaches a predetermined value.

6. In mechanism for controlling and maintaining pressure within a cabin having an outlet port for connecting the cabin interior with the exterior: a valve member in movable relation to said port externally thereof; yielding means urging the valve toward closed position and yielding to permit the valve to open under pressure of air on the port side thereof; and pressure responsive means directly connected to said valve member independently of said yielding means and disposed externally of said cabin and responding to variations in pressure of the air outside of said cabin for varying the position of said valve relative to said port as the pressure of air outside said cabin varies.

7. In a system for controlling and maintaining pressure within a cabin having means for delivering a flow of air under pressure thereinto: means forming an outlet valve port connecting the cabin interior with the exterior; a valve in movable relation to said port, the inner face of said valve being convexly contoured and exposed to the pressure of air in said cabin through said port; yielding means urging the valve in the closing direction and yielding to permit the valve to open when the differential of pressures on opposite sides of said valve reaches a predetermined value; and pressure responsive means outside said cabin and directly connected to said valve independently of said yielding means, said pressure responsive means comprising an aneroid element, the cross sectional area of said aneroid element being substantially equal to the area of said outlet valve port.

8. In a system for controlling and maintaining pressure within a cabin having means for delivering a flow of air under pressure into said cabin: a support adapted to be connected to the cabin wall; a wall carried by said support defining an outlet port connecting the interior of the cabin with the exterior thereof; a valve disposed outside said port so as to be moved toward and away from the port, said valve having an inner face exposed through said port to pressure of air derived from the interior of said cabin; a movable base supported by said support in a position spaced outwardly of said valve; means for limiting the movement of said valve relative to said base; a control element comprising collapsible wall means having one end secured to said base and having the opposite end connected to said valve and defining an evacuated collapsible chamber of substantially the same diameter as said port, said control element, upon expansion thereof, being adapted to move said valve toward said port; a spring urging said valve toward said port; and yielding means for urging said base and valve toward said port.

9. In a system for controlling and maintaining pressure within a cabin having means for delivering a flow of air under pressure into said cabin: outlet valve means for controlling the flow of air from the cabin and including a support adapted to be connected to the cabin wall; a wall carried by said support and defining an outlet port connecting the interior of said cabin with the exterior thereof; a valve disposed at the outer side of said port so as to be moved toward and away therefrom, said valve having an inner face exposed, through said port, to air pressure derived from the interior of said cabin; a pressure responsive control element having a base movably supported on said support in a position spaced outwardly of said valve, a collapsible wall connected at one end to said base and having its opposite end connected to said valve so that expansion of said control element will move the valve toward said port, the effective cross sectional area of said control element being substantially the same as the area of said port; and yielding means acting on said base for urging the base and valve toward the port.

10. In an outlet valve for controlling and maintaining pressure within an aircraft cabin having means for delivering a flow of air under pressure into said cabin: means forming an outlet port adapted to connect the cabin interior with the exterior; a valve in movable relation to the external side of said port; pressure responsive means including a movable wall connected to said valve, means supporting said pressure responsive means for movement toward and away from said valve port, one face of said valve being exposed to the pressure of air in said port over an area; yielding means urging the valve in a direction opposed to the direction of air pressure in said port, said valve moving toward and away from the port as the pressure of air outside the cabin decreases and increases; and yieldable means urging the support for said pressure responsive means toward the valve port and yielding in a valve opening direction when the differential pressure between the interior and exterior of said cabin reaches a predetermined value.

11. In a system for controlling and maintaining pressure within a cabin having means for delivering a flow of air under pressure into said cabin; means forming an outlet valve port connecting the cabin interior with the exterior; a valve in movable relation to said port externally thereof; pressure responsive means attached to said valve and defining an evacuated space disposed externally of the cabin, one face of said valve being exposed to the pressure of air in said port over an area substantially equal to the effective area of said pressure responsive means, said pressure responsive means controlling the position of said valve relative to the position of said port as the pressure of air outside of said cabin decreases and increases; resilient means urging the valve in a direction opposed to the pressure of air in said port; means for supporting the pressure responsive means and valve for movement toward and away from said port; and yieldable means urging said supporting means, pressure responsive means and valve toward said port and yielding when the differential of pressure between the interior and exterior of the cabin, as exerted on said valve, reaches a predetermined value.

12. In a system for controlling and maintaining pressure in a cabin having means for delivering the flow of air under pressure into said cabin, comprising: outlet valve means for controlling the flow of air from said cabin, including a wall which defines an air outlet port connecting the cabin interior with the exterior: a vavle in movable relation to said port externally thereof, one face of said valve being exposed to the pressure of air in said port; means for adjusting said wall with respect to said valve; pressure responsive means disposed externally of the cabin and connected to the valve; resilient means urging the valve in a direction opposed to the direction of pressure on said valve exerted through the port, said pressure responsive means controlling the movement of the valve toward and away from the port as the pressure of air outside the cabin decreases and increases; a support for the pressure responsive means and valve whereby said means and valve may move as a unit toward and away from the port; and yieldable means urging the support, pressure responsive means and valve toward the port and yielding to permit opening of the valve when the differential of pressure between the interior and exterior of the cabin reaches a predetermined value.

13. In a system for controlling and maintaining pressure within a cabin having means for delivering a flow of air under pressure into said cabin: outlet valve means for controlling the flow of air from the cabin, said means having an outlet valve port connecting the cabin interior with the exterior; a valve in movable relation to said port externally thereof and having one face exposed to the pressure of air in said port for urging said valve in the opening direction; pressure responsive means outside of said cabin comprising an aneroid element having a base and a movable wall connected to the valve so as to move said valve toward said port as said aneroid element expands; a support, said valve and aneroid being movably supported by said support; resilient means urging the valve in a direction opposed to the pressure of air in said port; a yielding means exerting pressure on the base of the aneroid for urging the aneroid and valve toward said port and permitting outward movement of the valve when the differential of pressure between the pressure in said port and the exterior of said cabin reaches a predetermined value.

HAROLD CRUZAN.

REFERENCES CITED

The following references are of record in the file of this patent:

UNITED STATES PATENTS

| Number | Name | Date |
| --- | --- | --- |
| 1,562,663 | Strong | Nov. 24, 1925 |
| 2,002,057 | Gregg | May 21, 1935 |
| 2,160,453 | Boles | May 30, 1939 |
| 2,208,554 | Price | July 16, 1940 |
| 2,258,054 | Heidbrink | Oct. 7, 1941 |
| 2,316,416 | Gregg | Apr. 13, 1943 |

FOREIGN PATENTS

| Number | Country | Date |
| --- | --- | --- |
| 4,453 | Australia | Oct. 28, 1926 |
| 679,386 | France | Jan. 9, 1930 |

OTHER REFERENCES

"Pressurized Cabin Control," by Tinker et al. "Aviation," January 1941 issue, pages 38, 119, 124. Copy in Div. 49.